(12) United States Patent
Lee et al.

(10) Patent No.: US 6,818,312 B2
(45) Date of Patent: Nov. 16, 2004

(54) HEAT-SHRINKABLE POLYESTER FILM

(75) Inventors: Jung-Gyu Lee, Anyang-si (KR); Nam-Il Kim, Suwon-si (KR); Sang-Il Kim, Suwon-si (KR)

(73) Assignee: SKC Limited (KR)

( * ) Notice: Subject to any disclaimer, the term of this patent is extended or adjusted under 35 U.S.C. 154(b) by 0 days.

(21) Appl. No.: 10/471,880

(22) PCT Filed: Mar. 14, 2002

(86) PCT No.: PCT/KR02/00441

§ 371 (c)(1),
(2), (4) Date: Sep. 11, 2003

(87) PCT Pub. No.: WO02/072677

PCT Pub. Date: Sep. 19, 2002

(65) Prior Publication Data
US 2004/0096681 A1 May 20, 2004

(30) Foreign Application Priority Data
Mar. 14, 2001 (KR) ......................................... 2001-13191

(51) Int. Cl.$^7$ .......................... B32B 27/08; B32B 27/18; B32B 27/20; B32B 27/28; B32B 27/36
(52) U.S. Cl. ...................... 428/447; 428/34.9; 428/446; 428/480; 428/910; 525/437; 525/444; 528/302; 528/307; 528/308; 528/308.6; 524/155; 524/156
(58) Field of Search ................................ 428/34.9, 446, 428/447, 480, 910; 525/437, 444; 528/302, 307, 308, 308.6; 524/155, 156

(56) References Cited

U.S. PATENT DOCUMENTS

| | | | | |
|---|---|---|---|---|
| 4,310,600 A | * | 1/1982 | Cross | 428/447 |
| 4,963,418 A | * | 10/1990 | Isaka et al. | 428/34.9 |
| 4,985,538 A | * | 1/1991 | Fukuda et al. | 528/305 |
| 5,370,930 A | * | 12/1994 | Ito | 428/335 |
| 5,415,942 A | * | 5/1995 | Anderson | 428/447 |
| 6,379,774 B1 | * | 4/2002 | Tojo et al. | 428/141 |
| 6,620,231 B2 | * | 9/2003 | Okubo et al. | 106/287.23 |
| 2002/0045068 A1 | * | 4/2002 | Tojo et al. | 428/694 SL |

FOREIGN PATENT DOCUMENTS

| | | | |
|---|---|---|---|
| JP | 02-239988 | * | 9/1990 |
| JP | 11-188813 | * | 7/1999 |

* cited by examiner

*Primary Examiner*—Vivian Chen
(74) *Attorney, Agent, or Firm*—Anderson Kill & Olick, P.C.

(57) ABSTRACT

Disclosed in this invention is a heat-shrinkable polyester film comprising a polyester film support and a coat layer formed on one or both sides of the polyester film support, said coat layer comprising a quaternary ammonium sulfate and a polysiloxane resin.

15 Claims, No Drawings

HEAT-SHRINKABLE POLYESTER FILM

FIELD OF THE INVENTION

The present invention is directed to a heat-shrinkable polyester film, more particularly, to a heat-shrinkable polyester film used for labeling or shrink-wrapping containers, which has improved antistatic and antiblocking properties.

BACKGROUND OF THE INVENTION

Heat shrinkable films have been extensively used e.g., for labeling bottles, batteries or electrolytic condensers, and covering containers and other products. Such heat-shrinkable films are formed of polyvinyl chloride, polystyrene and polyester, and they are required to have good sealing and shrinking properties as well as good heat resistance, chemical resistance, weatherability and printability.

Conventional heat-shrinkable films formed of polyvinyl chloride or polystyrene have relatively poor heat resistance, chemical resistance, weather resistance and heat-shrinkable properties. In particular, polyvinyl chloride-based heat-shrinkable films recently become increasingly disfavored because they emit toxic pollutants when incinerated Polystyrene films, on the other hand, have the problem of poor printability, requiring a special purpose ink. Polystyrene films also tend to undergo marked spontaneous shrinkage during long-term storage.

Heat-shrinkable polyester films formed of polyethylene terephthalate (PET) have satisfactory heat resistance, chemical resistance, weatherability and shrinking properties. However, the shrinkage stress and shrinkage ratio of a PET film are generally unacceptably high, giving non-uniform shrink-wrappings with a consequential distorting of an image printed thereon.

Japanese Laid-open Patent Publication Nos. 63-139725, 7-53416, 7-53737, 7-216107, 7-216109 and 9-254257 teach that the shrinkage rate of PET film can be adjusted by blending with a polyethylene terephthalate or a polybutylene terephthalate in a predetermined ratio, or by copolymerizing a dicarbonic acid component such as terephthalic acid and isophthalic acid with a diol component such as ethylene glycol and 1,4-cyclohexanedimethanol. Such heat-shrinkable films show some improvements in terms of uniform shrinkage, but they tend to accumulate electrostatic charges on the surface during handling and processing. The electrostatic charge attracts not only dust and other contaminants but also other film, causing ink blur, blocking, wrinkles and bad appearances.

To deal with this electrostatic problem of polyester films, U.S. Pat. No. 4,632,263 discloses a polyester film coated with a composition comprising a polymeric binder such as (meth)acrylic polymer, vinyl acetate polymer, vinylidene chloride polymer, and a quaternary ammonium salt, and U.S. Pat. No. 4,214,035, a biaxially oriented polyester film having a latex coating containing a crosslinkable acrylate polymer and ammonium nitrate. However, when the antistatic coatings taught in these patents are applied to a heat shrinkable film, the coating layer does not firmly adhere to the film surface and also shows poor water resistance. Therefore, such coating layer may be easily washed off in a moist environment with consequential loss of antistatic properties.

Japanese Laid-open Publication No. 5-271523 discloses a coating comprising a water-soluble polyester, a conductive polymer and a surfactant. However, such a composition containing a surfactant may become foamy during a coating process, besides the problem of its poor water-resistance.

SUMMARY OF THE INVENTION

Accordingly, it is a primary object of the present invention to provide a heat shrinkable film having improved surface properties including antistatic properties, antiblocking, printability, slipping properties and thermal sticking resistance as well as thermal shrinkage properties.

The above object of the invention can be accomplished by a heat-shrinkable polyester film comprising a polyester film support and a coat layer formed on one or both sides of the polyester film support, said coat layer comprising a quaternary ammonium sulfate of formula (I) and a polysiloxane resin of formula (II):

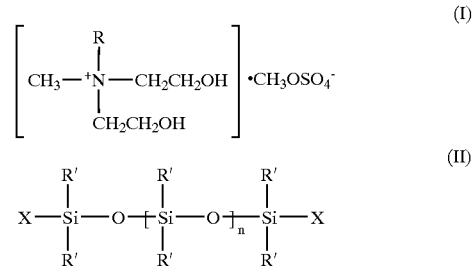

wherein,

R is $CH_3$, OH, H or COOH;

R' is $CH_3$, COOH, OH or $CH_2CH_2OH$;

X is Cl, OH, $OCH_3$, $OC_2H_5$, H, $NH_2$, $N(CH_3)_2$ or $CH=CH_2$; and n is a number in the range of 2 to 15.

DETAILED DESCRIPTION OF THE INVENTION

Heat-shrinkable polyester films according to the present invention comprise a coat layer containing a quaternary ammonium sulfate of formula I and a polysiloxane resin of formula II.

The coat layer according to the present invention can be formed by applying a coating composition prepared by mixing an ammonium sulfate of formula I with a solvent and adding a polysiloxane resin of formula II into the mixture, on at lest one side of a polyester film support, and drying.

Ammonium sulfate derivatives useful for the present invention are compounds of formula I in which R is $CH_3$, OH, H or COOH. Such ammonium sulfates contribute to the improvements in antistatic property, slipping property, processibility (i.e., cutting, labeling, etc.) of films. In a preferred embodiment, the ammonium sulfate content in the coating composition is from 0.01 to 1% by weight based on the total weight of the composition. When the ammonium sulfate content is less than 0.01% by weight, the antistatic effect is negligible, and if it is more than 1% by weight, blocking between films may occur. It is preferable that an aqueous solution of ammonium sulfate derivative is mixed with a solvent such as toluene, methylethylketone, isopropryl alcohol, ethyl alcohol or a mixture therof.

A polysiloxane resin useful for the present invention is a polymer of formula II, wherein R' is $CH_3$, COOH, OH or $CH_2CH_2OH$; X is Cl, OH, $OCH_3$, $OC_2H_5$, H, $NH_2$, $N(CH_3)_2$ or $CH=CH_2$; and n is a number in the range of 2 to 15. Such a polysiloxane resin contributes to the improvements in coating strength, antistatic property, water resistance and solvent adhesiveness between films. In a preferred embodiment, the polysiloxane resin content in the coating composition is 0.01 to 0.5% by weight based on the total weight of the composition. If the polysiloxane resin content is less than 0.01% by weight, poor coatability results, and if it is more than 0.5% by weight, the coating becomes unstable.

The coating composition may further comprise conventional additives such as a pH regulating agent, antioxidant, dye, pigment, slipping agent, etc.

The coating composition prepared according to the above-mentioned process may be applied on the surface of a polyester film support during a process of preparing a heat shrinkable polyester film (In-line process), or after a heat-shrinkable polyester film is prepared (Off-line process), by means of a conventional process, e.g., the gravure roll, reverse roll or Meyer rod process.

The coat layer formed by applying the coating composition on a polyester film support and drying, preferably has a thickness in the range of 0.01 to 5 μm. If the thickness is less than 0.01 μm, the coat layer may not impart sufficient antistatic property and water resistance. If the thickness is more than 5 μm, blocking between films may occur and the solvent adhesiveness becomes unsatisfactory. That is, if the coat layer is excessively thick, it is difficult to dry sufficiently at a low drawing temperature, which results in blocking between films on a roll, while the adhesiveness may become poor since it is difficult for a solvent to permeate into the film during a sealing process.

The polyester film support on which the coat layer is formed may be a conventional heat-shrinkable polyester film. However, it is preferable that the polyester film support comprises trimethylene terephthalate repeating unit so as to improve the thermal shrinkage ratio and the transparency thereof.

In accordance with one aspect of the present invention, the polyester film support comprises repeating units of trimethylene terephthalate, ethylene terephthalate and 2,2-dimethyl(-1,3-propylene)terephthalate.

The content of the trimethylene terephthalate repeat unit is preferably in the range of 5 to 25% by mole based on the total composition. If said repeating unit content is less than 5% by mole, the shrinkage ratio in the transverse direction with respect to the major shrinkage direction may become excessively high, the spontaneous shrinkage ratio at below 50° C. becomes high, and the film transparency deteriorates, and if it is higher than 25% by mole, excessive crystallization may occur during drawing and the shrinkage ratio in the major shrinkage direction become low.

The content of the ethylene terephthalate repeating unit is preferably in the range of 45 to 90% by mole based on the total composition. If the content of this repeating unit is less than 45% by mole, heat resistance and extendibility of the polyester film become poor, while if it is more than 90% by mole, the shrinkage ratio of the film may not be satisfactory and the adhesiveness becomes poor.

The content of the 2,2-dimethyl(-1,3-propylene) terephthalate repeating unit is preferably in the range of 5 to 30% by mole based on the total composition. If said content is less than 5% by mole, sufficient thermal shrinkage cannot be achieved during a shrink-wrapping process, and the strength of a uniaxially drawn film in the transverse direction may become low, while if it is more than 30% by mole, heat resistance and extendibility of the film become poor.

In the manufacture of the polyester film, it is preferable to blend a 2,2-dimethyl(-1,3-propane)diol-copolymerized polyester, prepared by copolymerizing terephthalic acid or dimethylterephthalate with a mixture of ethyleneglycol and 2,2-dimethyl(-1,3-propane)diol, with a polytrimethylene terephthalate and a polyethylene terephthalate.

In a preferred embodiment, the 2,2-dimethyl(-1,3-propane)diol copolymerized polyester comprises 75 to 85% by mole based on the amount of ethylene terephthalate repeating unit and 15 to 25% by mole of 2,2-dimethyl(-1,3-propylene) terephthalate repeating unit. If the content of 2,2-dimethyl(-1,3-propylene) terephthalate repeating unit is less than 15% by mole, the heat shrinkage ratio may not be sufficient, while if it is higher than 25% by mole, the film becomes excessively amorphous.

The intrinsic viscosity of the 2,2-dimethyl(-1,3-propane)diol copolymerized polyester is preferably from 0.5 to 0.7. The intrinsic viscosities of polytrimethylene terephthalate and polyethylene terephthalate are preferably 0.7 to 0.95 and 0.5 to 0.65, respectively.

According to another aspect of the present invention, the polyester film support may be prepared by polymerizing a dicarbonic acid component comprising terephthalic acid or dimethylphthalate with a diol component comprising propanediol. In a preferred embodiment, the dicarbonic acid component further comprises dimethyl isophthalate and dimethyl-2,6-naphthalene dicarboxylate, and the diol component further comprises 2,2-dimethyl(-1,3-propane)diol and ethyleneglycol.

It is preferable that the dicarbonic acid component comprises 70 to 100% by mole of dimethylterephthalate, 0 to 20% by mole of dimethylisophthalate and 0 to 20% by mole of dimethyl-2,6-naphthalene dicarboxylate. If the contents of the dimethylisophthalate and dimethyl-2,6-naphthalene dicarboxylate deviate from the above ranges, the polymerization reaction with the diol component may become sluggish.

The diol component preferably comprises 5 to 20% by mole of propanediol, 5 to 20% by mole of 2,2-dimethyl(-1,3-propane)diol and 60 to 90% by mole of ethyleneglycol. If the contents of propane diol and 2,2-dimethyl(-1,3-propane) diol are lower than the above ranges, the heat shrinkage ratio of the film may become unsatisfactory, and if they are higher than the above ranges, shrinkage stress may become excessively high.

The polyester film support used in the present invention may contain additives such as a dispersant, antiblocking agent, lubricant, etc., in amounts that would not adversely affect the film properties.

A polyester film support is prepared by melt extruding a polyester resin to form a molten sheet, cooling, solidifying the molten sheet, and uniaxially drawing the solidified sheet with a tenter.

The coating composition according to the present invention may be applied to a polyester sheet before drawing (In-line coating process) or to a uniaxially drawn polyester film (Off-line coating process). The polyester film having a coat layer on at least one surface thereof may be subsequently drawn to form a heat-shrinkable film. In a preferred embodiment, the thickness of the inventive heat-shrinkable film is in the range of 12 to 125 μm.

The present invention is further described and illustrated in Examples, which are, however, not intended to limit the scope of the present invention.

SYNTHESIS EXAMPLES 1 THROUGH 6

Polyethylene terephthalate (A) having an intrinsic viscosity of 0.62 was synthesized by a known method.

100 parts by mole of dimethyl terephthalate and 140 parts by mole of 1,3-propane diol were put into an autoclave equipped with a mixer and a distillation column, and tetrabutylenetitanate (an interesterification catalyst), was added in the amount of 0.05% by weight based on dimethyl terephthalate. After removing methanol formed, the temperature was raised to 220° C. for further reaction. After the interesterification was complete, trimethylphosphate (a stabilizer) was added in the amount of 0.045% by weight based on dimethyl terephtalalte, and antimonytrioxide (a polymerization catalyst) was further added 10 minutes later in the amount of 0.02% by weight. After 5 minutes, the resulting product was transferred to a second reactor equipped with a vacuum unit, and reacted at 280° C. for about 180 minutes to attain a polymer (B) of trimethylene terephthalate having an intrinsic viscosity of 0.85.

100 parts by mole of dimethyl terephthalate, 110 parts by mole of ethyleneglycol and 40 parts by mole of neopentylglycol (2,2-dimethyl(-1,3-propane)diol) were placed in an autoclave equipped with a mixer and a distillation column, and manganese acetate (an interesterification catalyst) was added in the amount of 0.07% by weight based on dimethyl terephthalate. After removing methanol formed, the temperature was raised to 220° C. for further reaction. After the interesterification was complete, trimethylphosphate was added in the amount of 0.04% by weight based on dimethyl terephtalalte. After 5 minutes, antimonytrioxide in the amount of 0.035% by weight and 0.005% by weight of tetrabutylenetitanate were added thereto, and stirred for 10 minutes. The resulting product was transferred to a second reactor equipped with a vacuum unit, and the pressure was slowly reduced while raising the temperature to 285° C. The temperature was maintained at that temperature for about 210 minutes, to obtain a neopentylglycol copolymerized polyester (C) having the intrinsic viscosity of 0.60.

The polyesters A. B and C were mixed at various ratios, and each mixture was melted at 280° C., extruded, and cooled by a casting roller maintained at 20° C., to obtain an amorphous sheet. The amorphous sheet was uniaxially drawn with a tenter, to obtain polyester film supports having the compositions shown in Table 1.

TABLE 1

| Synthesis Example No. | Content of Repeating Units (% by mole) | | |
|---|---|---|---|
| | Ethylene Terephthalate | Trimethylene terephthalate | 2,2-dimethyl(-1,3-propylene) terephthalate |
| 1 | 51 | 25 | 24 |
| 2 | 61 | 25 | 14 |
| 3 | 66 | 20 | 14 |
| 4 | 75 | 14 | 11 |
| 5 | 82 | 10 | 8 |
| 6 | 88 | 5 | 7 |

SYNTHESIS EXAMPLE 7

A polyester resin was synthesized using a dicarboxylic acid component composed of 80% by mole of dimethyl terephthalate, 15% by mole of dimethyl isophthalte and a diol component composed of 5% by mole of 2,6-naphthalenedicarboxylate, and 15% by mole of propanediol, 10% by mole of 2,2-dimethyl(-1,3-propane)diol, and 75% by mole of ethyleneglycol. The resin was dried, melted at 280° C., extruded, and cooled with a casting roller maintained at 20° C., and the resulting amorphous sheet was uniaxially drawn with a tenter, to obtain a polyester film support.

EXAMPLE 1

50 parts by weight of an aqueous dispersion (solid content: 50% w/w) of a mixture of two quaternary ammonium sulfates of formula I (70% by mole of $R=CH_3$ and 30% by mole of $R=COOH$) was added to 50 parts by weight of a mixture of toluene, methylethylketone and isopropylalcohol (5:4:1 by volume), and diluted with water to an the ammonium sulfate level of 0.38% by weight A polysiloxane resin of formula II ($R'=CH_2CH_2OH$ and X is $NH_2$, about 1000 of MW) was added to a level of 0.3% by weight and agitated sufficiently to obtain a coating composition.

The above coating composition was applied to one side of the polyester film prepared in Synthesis Example 1 by Meyer rod coating and, then, dried. Thereafter, the coated film was stretched in the transverse direction at a draw ration of 3.5:1, to obtain a heat-shrinkable polyester film having a thickness of 50 μm.

EXAMPLES 2 THROUGH 6

The procedure of Example 1 was repeated except that the respective polyester film supports prepared in Synthesis Examples 2 through 6 were used.

EXAMPLE 7

The procedure of Example 1 was repeated except that the quaternary sulfate content was 0.28% by weight based on the total weight of the coating composition.

EXAMPLE 8

The procedure of Example 1 was repeated except that the polysiloxane resin content was 0.5% by weight based on the total weight of the coating composition.

EXAMPLE 9

The procedure of Example 1 was repeated except that the quaternary sulfate and the polysiloxane resin contents were 0.28 and 0.5% by weight, respectively, based on the total weight of the coating composition.

EXAMPLE 10

The procedure of Example 1 was repeated except that the polyester film support prepared in Synthesis Example 7 was used.

EXAMPLES 11 THROUGH 13

The procedures of Examples 7 to 9 were repeated except that the polyester film support prepared in Synthesis Example 7 was used.

Comparative Examples 1 Through 6

The procedure of Example 1 was repeated except that the polyester film supports prepared in Synthesis Examples 1 through 6 were not coated with any coating composition.

Comparative Example 7

The procedure of Example 1 was repeated except that a polysiloxane resin was not included in the coating composition.

Comparative Example 8

The procedure of Example 1 was repeated except that a quaternary ammonium sulfate was not included in the coating composition.

Comparative Example 9

The procedure of Example 10 was repeated except that the polyester film support prepared in Synthesis Example 7 was not coated with a coating composition.

Comparative Example 10

The procedure of Example 10 was repeated except that a polysiloxane resin was not included in the coating composition.

Comparative Example 11

The procedure of Example 10 was repeated except that a quaternary ammonium sulfate was not added into the coating composition.

Performance Test I

The performances of the heat-shrinkable polyester films manufactured in Examples 1 through 13 and Comparative Examples 1 through 11 were measured for the following properties. The results are shown in Tables 2.

(1) Antistatic Properties

Antistatic property was evaluated by measuring surface resistivity in accordance with ASTM D257. Surface resistivity of less than $10^{12}$ Ω represents a film having excellent antistatic properties.

(2) Slipping Properties (Frictional Coefficient)

Static/dynamic frictional coefficient was measured under a 200 g load in accordance with ASTM D1894.

(3) Water Resistance

A polyester film was digested into a water bath at 23° C. for 24 hours, dried in air and its surface resistivity was measured. A polyester film having poor water resistivity shows a greater resistivity due to leaching away of the antistaic component from the coating.

(4) Antiblocking

The change in the appearance of the surface of a film roll was observed after a storage at 40° C. for six months.

(5) Thermal Sticking

Two sheets of a film were pressed together under a heat gradient (a pressure of 2 kgf/cm$^2$, 10 sec and 120° C.), and, then, its adhesive strength was measured with a peel tester. For each film sample this measurement was conducted before and after digesting a film in a water bath at 23° C. for 24 hour and drying under the ambient condition.

TABLE 2

| Example No. | Surface resistivity (Ω) | Frictional coefficient (static/dynamic) | Water resistance (Ω) | Blocking (Change in appearance) | Thermal sticking (gf/in) Before | Thermal sticking (gf/in) After |
|---|---|---|---|---|---|---|
| Ex. 1 | 6 × 10$^9$ | 0.38/0.30 | 1 × 10$^{10}$ | None | 10 | 10 |
| Ex. 2 | 6 × 10$^9$ | 0.38/0.30 | 1 × 10$^{10}$ | None | 10 | 10 |
| Ex. 3 | 5 × 10$^9$ | 0.35/0.30 | 8 × 10$^9$ | None | 10 | 10 |
| Ex. 4 | 3 × 10$^9$ | 0.35/0.30 | 5 × 10$^9$ | None | 10 | 10 |
| Ex. 5 | 3 × 10$^9$ | 0.35/0.30 | 5 × 10$^9$ | None | 10 | 10 |
| Ex. 6 | 1 × 10$^9$ | 0.35/0.25 | 3 × 10$^9$ | None | 10 | 10 |
| Ex. 7 | 1 × 10$^{10}$ | 0.38/0.30 | 5 × 10$^{10}$ | None | 10 | 10 |
| Ex. 8 | 6 × 10$^9$ | 0.35/0.25 | 1 × 10$^{10}$ | None | 10 | 10 |
| Ex. 9 | 1 × 10$^{10}$ | 0.35/0.25 | 5 × 10$^{10}$ | None | 10 | 10 |
| Ex. 10 | 6 × 10$^9$ | 0.38/0.30 | 6 × 10$^9$ | None | 10 | 10 |
| Ex. 11 | 1 × 10$^9$ | 0.35/0.29 | 1 × 10$^9$ | None | 10 | 10 |
| Ex. 12 | 6 × 10$^9$ | 0.29/0.24 | 6 × 10$^9$ | None | 10 | 10 |
| Ex. 13 | 1 × 10$^9$ | 0.27/0.24 | 1 × 10$^9$ | None | 10 | 10 |
| Com. Ex. 1 | 1 × 10$^{13}$↑ | 0.80/0.75 | 1 × 10$^{13}$↑ | Found | 2000↑ | 2000↑ |
| Com. Ex. 2 | 1 × 10$^{13}$↑ | 0.80/0.75 | 1 × 10$^{13}$↑ | Found | 2000↑ | 2000↑ |
| Com. Ex. 3 | 1 × 10$^{13}$↑ | 0.80/0.75 | 1 × 10$^{13}$↑ | Found | 2000↑ | 2000↑ |
| Com. Ex. 4 | 1 × 10$^{13}$↑ | 0.80/0.75 | 1 × 10$^{13}$↑ | Found | 2000↑ | 2000↑ |
| Com. Ex. 5 | 1 × 10$^{13}$↑ | 0.80/0.75 | 1 × 10$^{13}$↑ | Found | 2000↑ | 2000↑ |
| Com. Ex. 6 | 1 × 10$^{13}$↑ | 0.80/0.75 | 1 × 10$^{13}$↑ | Found | 2000↑ | 2000↑ |
| Com. Ex. 7 | 6 × 10$^9$ | 0.38/0.30 | 1 × 10$^{13}$↑ | None | 10 | 2000↑ |
| Com. Ex. 8 | 1 × 10$^{13}$↑ | 0.38/0.20 | 1 × 10$^{13}$↑ | None | 10 | 10 |
| Com. Ex. 9 | 1 × 10$^{13}$↑ | 0.80/0.67 | 1 × 10$^{13}$↑ | Found | 2000↑ | 2000↑ |
| Com. Ex. 10 | 6 × 10$^9$↑ | 0.38/0.30 | 1 × 10$^{13}$↑ | None | 800 | 2000↑ |
| Com. Ex. 11 | 1 × 10$^{13}$↑ | 0.38/0.30 | 1 × 10$^{13}$↑ | None | 500 | 2000↑ |

As can be seen from Table 2, the films of Comparative Examples 1 through 6 and 9 which do not comprise a coat layer on the surface, exhibited inferior antistatic properties, slipping properties, water resistance, antiblocking and thermal sticking. The films of Comparative Examples 7 and 10 having coatings of only quaternary ammonium sulfate showed inferior water resistance and antiblocking, although their antistatic, slipping and thermal sticking properties were good. The films of Comparative Examples 8 and 10 having polysiloxane coatings exhibited good thermal sticking, slipping and antiblocking properties, but poor antistatic properties.

In contrast, the polyester films of the present invention having coat layers comprising a quaternary ammonium sulfate and a polysiloxane resin showed excellent performance characteristics in all categories of the properties.

Performance Test II

The polyester films manufactured in Examples 1 through 13 were measured for the following performance properties. The results are shown in Tables 3.

(1) Thermal Shrinkage Ratio

A polyester film was cut into a 15 mm×200 mm (length) piece, treated in 80° C. water, and the length of the piece was measured, to determine thermal shrinkage ratio by the following formula Thermal shrinkage ratio (%)=[(L−l)/L]×100 wherein L is the length of film before thermal treatment, and l, the length of film after thermal treatment.

(2) Printability

A nitrocellulose ink was spread over the surface of a film sample and a pattern of predetermined regular intervals was printed using a razor blade. A semitransparent tape having an adhesive strength of 40 g/mm was pressed on the ink-coated surface of the film. The printability was evaluated by the amount of ink transferred onto the tape when peeled off from the surface, according to the following criteria.

○: No ink was transferred onto the tape.

Δ: 70% or less of the ink was transferred onto the tape.

x: 70% or more of the ink was transferred onto the tape.

x: The film became whitened or was non-uniform in thickness.

◇: Evaluation of the extendability was impossible due to irregular extensibility of the film.

(6) Break Strength

The rupture strength of a film was measured with a tensile strength tester (Model 6021, manufactured by Instron Co.). For measuring the break strength, a 10 cm×15 mm film sample was used.

(7) Haze

The haze of a film sample was measured using a haze tester (Model x1-211, manufactured by Gardner Neotech.)

TABLE 3

| Example No. | Shrinkage Ratio (%) MD* | Shrinkage Ratio (%) TD* | Printability | Adhesiveness | Covering property | Extendibility | Break strength (kgf/mm²) | Haze (%) |
|---|---|---|---|---|---|---|---|---|
| 1 | 48 | −1.9 | Δ | ○ | Δ | ○ | 6.8 | 3.9 |
| 2 | 48 | −1.0 | ○ | ○ | ○ | ○ | 5.7 | 3.9 |
| 3 | 52 | 0 | ○ | ○ | ○ | ○ | 5.5 | 4.2 |
| 4 | 52 | 0 | ○ | ○ | ○ | ○ | 5.2 | 4.7 |
| 5 | 52 | 0.8 | ○ | ○ | ○ | ○ | 5.4 | 5.2 |
| 6 | 45 | 1.1 | ○ | ○ | Δ | ○ | 4.9 | 5.3 |
| 7 | 48 | −1.9 | ○ | ○ | Δ | ○ | 6.8 | 3.9 |
| 8 | 48 | −1.9 | ○ | ○ | ○ | ○ | 5.7 | 3.9 |
| 9 | 48 | −1.7 | ○ | ○ | ○ | ○ | 5.5 | 4.2 |
| 10 | 45 | 1.0 | ○ | ○ | ○ | ○ | 5.2 | 4.7 |
| 11 | 48 | −0.7 | ○ | ○ | Δ | ○ | 6.8 | 3.9 |
| 12 | 48 | 0 | ○ | ○ | ○ | ○ | 5.7 | 3.9 |
| 13 | 45 | 1.0 | ○ | ○ | ○ | ○ | 5.5 | 4.2 |

*MD and TD indicate the shrinkage ratios in the major shrinkage direction and in the traverse direction with respect to the major shrinkage direction, respectively, of the films.

(3) Adhesive Property of Solvent-treated Surface

The swelling and adhesiveness of a films treated with tetrahydrofuran (THF), was evaluated according to the following criteria.

○: The adhesion part was transparent and instantaneous adhesiveness was excellent.

x: The instantaneous adhesiveness was poor (4) Covering Property over Glass Bottle A 10 mm×10 mm grid was patterned on a heat-shrinkable film, rolled and shaped into a cylindrical shape having a diameter of 65 mm using THF. Then, a commercial glass bottle (having a capacity of 334 ml) was covered with the cylindrical heat-shrinkable film in 85° C. or 90° C. water. The covering was evaluated according to the following criteria.

○: The grid on the glass bottle was undistorted and fitting of the film to the shape of the lid of the bottle was good after shrink-covering at 90° C.

Δ: The grid on the glass bottle was undistorted and the fitting of the film to the shape of the lid of the bottle was good after shrink-covering at 85° C.

x: The grid was distorted and the fitting of the film to the shape of the lid of the bottle was poor after shrink-covering at 85° C.

(5) Extendablility

The appearance and the uniformity in thickness of a film after drawing were observed, and evaluated according to the following criteria.

○: The film had good uniformity in thickness without whitening.

As shown in Table 3, the heat-shrinkable polyester films manufactured in Examples 1 through 13 according to the present invention are excellent in terms of thermal shrinkage ratio, printability, extendibility, break strength, adhesiveness and transparency. Thus, the inventive heat-shrinkable films having such desirable properties can be advantageously used as labels or coverings for a variety of containers.

While the invention has been described with respect to the above specific embodiments, it should be recognized that various modifications and changes may be made to the invention by those skilled in the art which also fall within the scope of the invention as defined by the appended claims.

What is claimed is:

1. A heat-shrinkable polyester film comprising a polyester film support and a coat layer formed on one or both sides of the polyester film support, said coat layer comprising a quaternary ammonium sulfate of formula (I) and a polysiloxane resin of formula (II):

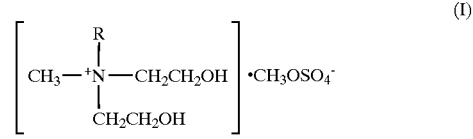

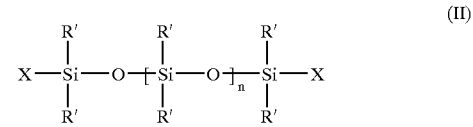

wherein,

R is $CH_3$, OH, H or COOH;

R' is $CH_3$, COOH, OH or $CH_2CH_2OH$;

X is Cl, OH, $OCH_3$, $OC_2H_5$, H, $NH_2$, $N(CH_3)_2$ or $CH=CH_2$; and n is a number in the range of 2 to 15.

2. The heat-shrinkable polyester film of claim 1, wherein the coat layer is formed using a coating composition comprising, based on the total weight of the composition, from 0.01 to 1% by weight of the quaternary ammonium sulfate of formula (I), from 0.01 to 0.5% by weight of the polysiloxane resin of formula (II), and a solvent.

3. The heat-shrinkable polyester film of claim 1, wherein the coat layer has a dry thickness in the range of 0.01 to 5 µm.

4. The heat-shrinkable polyester film of claim 1, wherein the polyester film support comprises trimethylene terephthalate repeating unit.

5. The heat-shrinkable polyester film of claim 4, further comprising ethylene terephthalate and 2,2-dimethyl(-1,3-propylene)terephthalate repeating units.

6. The heat-shrinkable polyester film of claim 5, wherein the content of trimethylene terephthalate repeating unit is in the range of 5 to 25% by mole, the content of ethylene terephthalate repeating unit is in the range of 45 to 90% by mole, and the content of 2,2-dimethyl(-1,3-propylene) terephthalate repeating unit is in the range of 5 to 30% by mole.

7. The heat-shrinkable polyester film of claim 6, wherein the polyester film support is prepared by blending a polytrimethylene terephthalate, a polyethylene terephthalate and a 2,2dimethyl(-1,3-propane)diol-copolymerized polyester.

8. The heat-shrinkable polyester film of claim 7, wherein the intrinsic viscosities of the polytrimethylene terephthalate and the polyethylene terephthalate are in the ranges of 0.7 to 0.95 and 0.5 to 0.65, respectively.

9. The heat-shrinkable polyester film of claim 7, wherein the 2,2-dimethyl(-1,3-propane)diol-copolymerized polyester is prepared by copolymerizing terephthalic acid or dimethyl terephthalate with a mixture of ethyleneglycol and 2,2-dimethyl(-1,3-propane)diol.

10. The heat-shrinkable polyester film of claim 9, wherein the intrinsic viscosity of the 2,2-dimethyl(-1,3-propane)diol-copolymerized polyester is in the range of 0.5 to 0.7.

11. The heat-shrinkable polyester film of claim 9, wherein the 2,2-dimethyl(-1,3-propane)diol-copolymerized polyester comprises 75 to 85% by mole of ethylene terephthalate repeating unit and 15 to 25% by mole of 2,2-dimethyl(-1,3-propylene)terephthalate repeating unit.

12. The heat-shrinkable polyester film of claim 4, wherein the trimethylene terephthalate repeating unit is prepared by polymerizing terephthalic acid or dimethyl terephthalate with propanediol.

13. The heat-shrinkable polyester film of claim 12, wherein the dicarbonic acid component further comprises dimethyl isophthalate and dimethyl-2,6-naphthalene dicarboxylate, and the diol component further comprises 2,2-dimethyl(-1,3-propane)diol and ethyleneglycol.

14. The heat-shrinkable polyester film of claim 13, wherein the dicarbonic acid component comprises 70 to 100% by mole of dimethylterephthalate, 0 to 20% by mole of dimethylisophthalate and 0 to 10% by mole of dimethyl-2,6-naphthalene dicarboxylate.

15. The heat-shrinkable polyester film of claim 13, wherein the diol component comprises 5 to 20% by mole of propanediol, 5 to 20% by mole of 2,2-dimethyl(-1,3-propane)diol and 60 to 90% by mole of ethyleneglycol.

* * * * *